United States Patent Office 3,819,634
Patented June 25, 1974

3,819,634
4-PHENYL-3-THIOACRYLAMINOQUINOLINES
Kanji Meguro, Takarazuka, Hiroshi Miyano, Nishinomiya, Yutaka Kuwada, Ashiya, Teruji Henmi, Amagasaki, and Togo Yamano, Yamatotakada, Japan, assignors to Takeda Chemical Industries, Ltd., Osaka, Japan
No Drawing. Filed July 20, 1971, Ser. No. 164,471
Claims priority, application Japan, July 23, 1970, 45/64,586
Int. Cl. C07d 33/50
U.S. Cl. 260—283 S                  17 Claims

ABSTRACT OF THE DISCLOSURE

Compounds of the formula

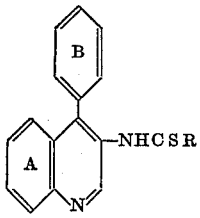

where R is hydrogen, alkyl, cycloalkyl, aralkyl or aryl and each of rings A and B is unsubstituted or substituted by 1–4 of the same or different substituents selected from halogen, nitro, trifluoromethyl, amino, alkylamino, alkylthio, lower alkyl and lower alkoxy, possess effective antitrichomonas and antiulcer activities, and low toxicity.

---

The present invention relates to novel and useful quinoline derivatives and a method for producing them, and more particularly to compounds of the general formula:

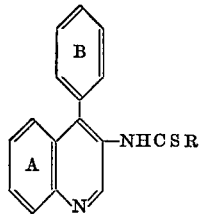

(I)

wherein R is hydrogen or hydrocarbon residue and each of the rings A and B has no substituent or has one to four substituents selected from the group consisting of halogen, nitro, trifluoromethyl, amino, alkylamino, alkylthio, lower alkyl and lower alkoxy group.

The present inventors have made extensive studies on quinoline derivatives and succeeded in synthesizing the novel quinoline derivatives (I) above mentioned and further found that they have an effective antitrichomonas and antiulcer activity with low toxicity. The present invention was accomplished on the basis of this finding. It is the principal object of the present invention to provide the novel and useful compounds of the formula (I).

Another object of the present invention is to provide a method for producing the compounds of the formula (I).

A further object is to provide new pharmaceutical compositions containing compounds (I) and therapeutic use thereof.

Other objects of the present invention and advantageous features thereof will become apparent as the description proceeds.

In the general formula (I), R is hydrogen or hydrocarbon residue which may be a straight or branched-chained or cyclic alkyl group having 1 to 15 carbon atoms, such as methyl, ethyl, propyl, isopropyl, butyl, isobutyl, pentyl, hexyl, pentadecyl, or cyclohexyl, an aralkyl group such as benzyl or phenethyl or an aryl group such as phenyl, tolyl or chlorophenyl.

Each of the rings A and B may have at optional position one to four, same or different, substituents selected from the group consisting of halogens (e.g. fluorine, chlorine, bromine, iodine), nitro, trifluoromethyl, amino, alkylamino (e.g. methylamino, ethylamino, dimethylamino, diethylamino), alkylthio (e.g. methylthio, ethylthio), lower alkyl groups (e.g. methyl, ethyl, propyl, isopropyl, butyl or isobutyl) and lower alkoxy groups (e.g. methoxy, ethoxy, propoxy, isopropoxy).

These compounds (I) are prepared by reacting the compounds represented by the general formula:

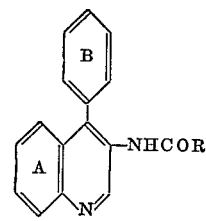

(II)

wherein all the symbols have the same meaning as above, with phosphorus pentasulfide.

The reaction may generally be carried out in the solvent, which may desirably be a basic solvent such as pyridine or collidine. A mixture of the said basic solvent and an appropriate inactive solvent such as benzene, toluene or xylene may be employable. The reaction may generally be conducted at the boiling point of the solvent. Phosphorus pentasulfide may generally be employed from 0.5 to 1.5 mol in terms of $P_2S_5$ relative to 1 mol of the compounds (I).

The end point of the reaction can be confirmed by the disappearance of the spot corresponding to the compound (I) employing thin layer chromatography. The reaction completes in a period ranging from about 20 minutes to a few hours, usually one to two hours.

The product may be isolated in any desired purity by a separation or purification method which is known per se. For example, the product is obtained by removing the solvent after the completion of the reaction, extracting the residue with a suitable solvent (e.g. chloroform) and finally recrystallizing the crude product from a suitable solvent, or alternatively by refining with chromatography.

The starting compounds (II) of the present invention may be produced, for example, by acylation of 3-amino-4-phenylquinoline derivatives (III) having the general formula

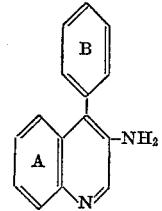

(III)

wherein all the symbols have the same meaning as mentioned above, with an appropriate acrylating agent. The compound (III) may be produced, for example, starting from 2-amino-benzophenone in accordance with the method described in Journal of the Chemical Society (1953)

3914, or by subjecting 2-amino-α-phenyl-benzylideneaminoacetal derivatives (IV) having the general formula

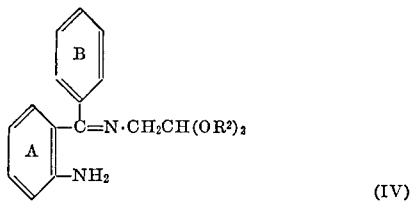

wherein R² represents lower alkyl and the rings A and B have the same meaning as mentioned above, to cyclization in the presence of alcoholic hydrogen chloride.

Thus obtained compounds (I) have effective antitrichomonas and antiulcer activity, with low toxicity (for example, the median lethal dose of 6-chloro-4-phenyl-3-thioacetylaminoquinoline is larger than 4000 milligrams per kilogram in mice by oral administration).

With regard to antiulcer action, the compounds can treat effectively ulcers of various types (e.g. gastric ulcer, duodenal ulcer, intestinal ulcer, etc.) and, furthermore, the compounds can prevent ulcers, particularly those caused by anti-inflammatory agents, and therefore, it is recommended to administer anti-inflammatory agents (e.g. Phenylbutazone, Indomethacine, Ibufenac) together with the present compound in order to prevent ulcer caused by the anti-inflammatory agents.

Therefore, the compounds (I) are useful as medicines such as antitrichomonas agent, antiulcer agent or preventive medicines against ulcers, particularly, those caused by anti-inflammatory agents.

When the compounds (I) are employed as antiulcer agents and/or medicines for treating or preventing ulcers, particularly those caused by anti-inflammatory agents, or employed an antitrichomonas agents and/or medicines for treating trichomoniasis, these compounds are administered *per se* or in the form of a pharmaceutically acceptable composition in admixture with suitable and conventional carriers or adjuvants.

The pharmaceutical composition may take the form of tablet or vaginal tablet, granules, powders, capsules, suppository or ointment, and may be administered orally of non-orally.

As an antiulcer agent or particularly as preventive medicine against ulcers particularly, those caused by anti-inflammatory agents usual daily doses of the present compounds lie in the range of about 50 milligrams to about 1 gram per adult human in oral administration. As an antitrichomonas agent, a usual daily dose of the present compounds lies in the range about 10 milligrams to about 1 gram per adult human in oral administration.

Some examples of practical recipies in which the compounds of this invention are utilized as remedies for ulcers or trichomoniasis are as follows:

Tablets

| | Weight parts |
|---|---|
| 6-chloro-4-phenyl-3-thioacetylaminoquinoline | 20 |
| Lactose | 140 |
| Corn starch | 60 |
| Hydroxypropylcellulose | 8 |
| Magnesium stearate | 2 |
| Total milligrams per tablet | 230 |

Capsules

| | Weight parts |
|---|---|
| 6-chloro-4-phenyl-3-thioacetylaminoquinoline | 20 |
| Lactose | 110 |
| Corn starch | 80 |
| Hydroxy propylcellulose | 8 |
| Magnesium stearate | 2 |
| Total milligrams per capsule | 220 |

It is to be understood that the following examples are solely for the purpose of illustration and not to be construed as limitations of this invention, and that many variations may be resorted to without departing from the spirt and scope of this invention. In this specification, the term "part(s)" means weight part(s) unless otherwise specified and the relation between "part(s)" and "part(s) by volume" corresponds to that between gram(s) and milliliter(s). All temperatures are uncorrected, and all percentages are on the weight basis.

EXAMPLE 1

A mixture of 10 parts by volume of acetic anhydride and 3.8 parts of 3-amino-6-chloro-4-phenylquinoline is heated on a boiling water bath to make a solution and it is kept standing at room temperature. After cooling, 40 parts by volume boiling water and added to the mixture and the resulting crystals are collected by filtration. Recrystallization from acetone-benzene gives 4.2 parts of 3-acetylamino-6-chloro - 4 - phenylquinoline as colorless prisms melting at 200 to 202° C.

To a solution of 14.9 parts of 3-acetylamino-6-chloro-4-phenylquinoline in 100 parts by volume of pyridine are added 5.6 parts of phosphorus pentasulfide. After refluxing for 2 hours, the reaction mixture is concentrated under reduced pressure. The residue is extracted with chloroform. Insoluble tar-like substance is removed from chloroform layer by being adsorbed on active alumina. Then, the chloroform layer is concentrated under reduced pressure. The residue is washed with ethanol and dried, whereupon 14.6 parts of 6-chloro-4-phenyl-3-thioacetylaminoquinoline is obtained as pale yellow crystals. Recrystallization from ethyl acetate gives pale yellow needles melting at 213–214° C.

The minimum inhibitory concentration (MIC) of 6-chloro-4-phenyl - 3 - thioacetylaminoquinoline is 0.25–0.5 μg./ml., while that of Metronidazole (control) is 0.78–1.5 μg./ml. These MIC are assayed by the liquid dilution method employing *Trichomonas vaginalis* strain No. 4F incubating at 37° C. for 42 hours in the medium (pH 6.5) containing 0.2% of L-cysteine, 0.5% of sodium chloride, 1% of glucose, 1% of yeast extract, 2% of "Polypepton" (trade name of a casein hydrolyzate produced by Daigo Nutritive Chemicals Ltd. Osaka, Japan) and 1% of horse serum.

EXAMPLE 2

The following compounds are prepared in a similar manner as mentioned above Example 1.

6-chloro-4-phenyl - 3 - thiopropionylaminoquinoline, pale yellow needles melting at 157–159° C.

6-chloro-4-phenyl - 3 - thioisovalerylaminoquinoline, pale yellow needles melting at 194–195° C.

6-chloro-4-phenyl - 3 - thiopalmitoylaminoquinoline, pale yellow crystals melting at 88–90° C.

6-chloro-4-phenyl - 3 - thiobenzoylaminoquinoline, yellow needles melting at 175–177° C.

6-chloro - 4 - phenyl - 3 - thiophenylacetylaminoquinoline, yellow needles melting at 167–168° C.

6-chloro-4-(2-chlorophenyl)-3 - thioacetylaminoquinoline, yellow crystals melting at 234–235° C.

6-chloro-4-(4-methoxyphenyl - 3 - thioacetylaminoquinoline, yellow prisms melting at 223–224° C.

6-bromo - 4 - phenyl - 3 - thioacetylaminoquinoline, yellow needles melting at 215–216° C.

6-iodo-4-phenyl-3-thioacetylaminoquinoline, orange brown plates melting at 203–204° C.

6-methyl-4 - phenyl - 3 - thioacetylaminoquinoline, yellow needles melting at 193–195° C.

6-methoxy-4-phenyl - 3 - thioacetylaminoquinoline, yellow needles melting at 203–204° C.

6,7-dimethoxy - 4 - phenyl - 3 - thioacetylaminoquinoline, orange brown prisms melting at 180–181° C.

Having thus disclosed the invention, what is claimed is:

1. A compound of the formula

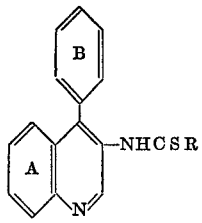

wherein R is hydrogen, alkyl of 1–15 carbon atoms, benzyl, phenethyl, phenyl, tolyl or chlorophenyl, ring A is unsubstituted or substituted in at least one of the 6- and 7-positions by the same or different substituents selected from the group consisting of halogen, methyl and methoxy and ring B is unsubstituted or substituted in the 2- or 4-position by halogen or methoxy.

2. A compound as claimed in claim 1, wherein the ring A has a halogen atom as the substituent.

3. A compound as claimed in claim 1, wherein the ring A has a methyl group as the substituent.

4. A compound as claimed in claim 1, wherein the ring A has a methoxy group as the substituent.

5. The compound as claimed in claim 2, wherein the compound is 6-chloro-4-phenyl-3-thioacetylaminoquinoline.

6. The compound as claimed in claim 2, wherein the compound is 6-chloro-4-phenyl-3-thiopropionylaminoquinoline.

7. The compound as claimed in claim 2, wherein the compound is 6-chloro-4-phenyl-3-thioisovalerylaminoquinoline.

8. The compound as claimed in claim 2, wherein the compound is 6-chloro-4-phenyl-3-thiopalmitoylaminoquinoline.

9. The compound as claimed in claim 2, wherein the compound is 6-chloro-4-phenyl-3-thiobenzoylaminoquinoline.

10. The compound as claimed in claim 2, wherein the compound is 6-chloro-4-phenyl-3-thiophenylacetylaminoquinoline.

11. The compound as claimed in claim 2, wherein the compound is 6-chloro-4-(2-chlorophenyl)-3-thioacetylaminoquinoline.

12. The compound as claimed in claim 2, wherein the compound is 6-chloro-4-(4-methoxyphenyl)-3-thioacetylaminoquinoline.

13. The compound as claimed in claim 2, wherein the compound is 6-bromo-4-phenyl-3-thioacetylaminoquinoline.

14. The compound as claimed in claim 2, wherein the compound is 6-iodo-4-phenyl-3-thioacetylaminoquinoline.

15. The compound as claimed in claim 3, wherein the compound is 6-methyl-4-phenyl-3-thioacetylaminoquinoline.

16. The compound as claimed in claim 4, wherein the compound is 6-methoxy-4-phenyl-3-thioacetylaminoquinoline.

17. The compound as claimed in claim 4, wherein the compound is 6,7-dimethoxy-4-phenyl-3-thioacetylaminoquinoline.

References Cited
UNITED STATES PATENTS

| | | | |
|---|---|---|---|
| 3,397,055 | 8/1968 | Weil | 71—100 |
| 3,555,030 | 1/1971 | Loev | 260—283 S |

DONALD G. DAUS, Primary Examiner

U.S. Cl. X.R.

260—283 SY, 287 R, 288 R; 424—258